United States Patent
Mastenbrook et al.

(10) Patent No.: US 11,163,442 B2
(45) Date of Patent: Nov. 2, 2021

(54) SELF-FORMATTING DATA STORAGE DEVICE

(71) Applicant: Western Digital Technologies, Inc., San Jose, CA (US)

(72) Inventors: Brian Edward Mastenbrook, Fremont, CA (US); Matthew Harris Klapman, San Jose, CA (US)

(73) Assignee: Western Digital Technologies, Inc.

( * ) Notice: Subject to any disclaimer, the term of this patent is extended or adjusted under 35 U.S.C. 154(b) by 55 days.

(21) Appl. No.: 16/706,822

(22) Filed: Dec. 8, 2019

(65) Prior Publication Data
US 2021/0173561 A1    Jun. 10, 2021

(51) Int. Cl.
*G06F 3/06* (2006.01)

(52) U.S. Cl.
CPC ............ *G06F 3/0604* (2013.01); *G06F 3/064* (2013.01); *G06F 3/067* (2013.01); *G06F 3/0622* (2013.01); *G06F 3/0638* (2013.01); *G06F 3/0652* (2013.01); *G06F 3/0659* (2013.01); *G06F 3/0689* (2013.01)

(58) Field of Classification Search
CPC .... G06F 3/0604; G06F 3/0622; G06F 3/0638; G06F 3/064; G06F 3/0652; G06F 3/0659; G06F 3/067; G06F 3/0689; G06F 21/602; G06F 2211/007
See application file for complete search history.

(56) References Cited

U.S. PATENT DOCUMENTS

| | | | | |
|---|---|---|---|---|
| 5,933,631 A | * | 8/1999 | Mealey | G06F 11/1417 713/2 |
| 6,377,958 B1 | * | 4/2002 | Orcutt | G06F 16/116 707/690 |
| 7,120,735 B1 | * | 10/2006 | Summers | G06F 3/0605 711/111 |
| 9,286,493 B2 | | 3/2016 | Johnson et al. | |
| 9,813,416 B2 | | 11/2017 | Bolotin et al. | |
| 10,083,130 B2 | | 9/2018 | Bolotin et al. | |
| 10,146,706 B2 | | 12/2018 | Bolotin et al. | |
| 10,154,020 B1 | | 12/2018 | Bolotin et al. | |
| 10,181,055 B2 | | 1/2019 | Bolotin et al. | |
| 10,204,240 B2 | | 2/2019 | Johnson et al. | |
| 10,313,874 B2 | | 6/2019 | Amundsen et al. | |

(Continued)

OTHER PUBLICATIONS

Athow, Desire, "SecureData SecureDrive BT 1TB review" Retrieved online, URL: <https://www.techradar.com/reviews/securedata-securedrive-bt-1tb>, accessed on Oct. 24, 2019.

(Continued)

*Primary Examiner* — Andrew J Cheong
(74) *Attorney, Agent, or Firm* — Patent Law Works LLP

(57) ABSTRACT

Disclosed here is a data storage device comprising a non-transitory storage medium configured to store user content data, a data port configured to transfer the user content data between the storage medium and a host computer system over a data channel, and a controller. The controller is configured to select one of multiple file system formats, format the storage medium by creating a file system in accordance with the selected file system format on the storage medium, and register with the host computer system as a block data storage device.

18 Claims, 6 Drawing Sheets

(56) References Cited

U.S. PATENT DOCUMENTS

| | | | |
|---|---|---|---|
| 2008/0247540 A1* | 10/2008 | Ahn | H04L 9/0877 380/44 |
| 2009/0287767 A1* | 11/2009 | Pothos | H04L 41/5061 709/203 |
| 2010/0088527 A1 | 4/2010 | Johnson et al. | |
| 2010/0174913 A1 | 7/2010 | Johnson et al. | |
| 2016/0364167 A1* | 12/2016 | Makida | G06F 3/061 |
| 2018/0307869 A1 | 10/2018 | Bolotin et al. | |
| 2018/0357406 A1 | 12/2018 | Bolotin et al. | |
| 2019/0007203 A1 | 1/2019 | Bolotin et al. | |
| 2019/0303603 A1 | 10/2019 | Courtney et al. | |

OTHER PUBLICATIONS

Smith, Lyle, "SecureData SecureDrive BT External Drive Review" Retrieved online, URL: <https://storagereview.com/securedata_securedrive_bt_external_drive_review>, accessed on Oct. 24, 2019.

Van Allen, Fox, "How to Unlock Your Computer Automatically With Your Phone" Retrieved online, URL: <https://www.techlicious.com/tip/computer-proximity-locks-for-mac-pc-chromebook/>, accessed on Oct. 24, 2019.

"DataLock BT Remote Management", Retrieved online, URL: <https://www.clevx.com/datalock-bluetooth-encrypted-security/>, accessed on Oct. 24, 2019.

McCallum, Nathaniel, et al., latchset / Tang, GitHub Post, Aug. 10, 2018, v7, p. 1-8, https://github.com/latchset/tang#recovery.

McCallum, Nathaniel, Network Bound Encryption for Data-at-Rest Protection, Red Hat, Inc. Presentation, https://www.snia.org/sites/default/files/SDC15_presentations/security/NathanielMcCallum_Network_Bound_Encryption.pdf.

Red Hat Enterprise Linux 8, Security hardening, Products & Services pamphlet, Chapter 9, Configuring automated unlocking of encrypted volumes using policy-based decryption, Red Hat Products & Services Webpage, 2020, p. 64-82, https://access.redhat.com/documentation/en-us/red_hat_enterprise_linux/8/html/security_hardening/configuring-automated-unlocking-of-encrypted-volumes-using-policy-based-decryption_security-hardening.

Scherf, Thorsten, Automatic data encryption and decryption with Clevis and Tang, Passing Secrets, Admin Network & Security, Online Magazine Article, 2018, p. 1-6, Issue 43, https://www.admin-magazine.com/Archive/2018/43/Automatic-data-encryption-and-decryption-with-Clevis-and-Tang.

Tweedale, Fraser, Introduction to Tang and Clevis, Frasers IdM Blog, Feb. 11, 2016. p. 1-5, https://frasertweedale.github.io/blog-redhat/posts/2016-02-11-tang-tls.html.

* cited by examiner

SELF-FORMATTING DATA STORAGE DEVICE

TECHNICAL FIELD

This disclosure relates to a self-formatting data storage device.

BACKGROUND

Data storage devices are used to store user content data in the form of files. Data storage devices incorporate a storage medium on which the files are written to and read from. Data storage devices can be communicatively connected to a host computer system to provide the host computer system with a means to write files to the storage medium, and read files from the storage medium.

Storage mediums within data storage devices are often formatted with a file system before a host computer system can store files on the storage medium. A file system provides an organized structure for storing files, and a record of file location on the storage medium to enable accurate retrieval of the files stored on the storage medium. Formatting a storage medium with a file system entails writing the organized structure to the storage medium, in preparation for the subsequent writing of files to the storage medium.

In some cases, a new data storage device, as provided by the manufacturer, has not been formatted with a file system; therefore, the data storage device must be formatted before first use of the data storage device. Additionally, it may be desired to reformat a data storage device that has been previously formatted to enable reuse of the storage medium on the data storage device.

Numerous different file system formats are available for application to a storage medium, including New Technology File System (NTFS), File Allocation Table (FAT), Extended FAT (exFAT), RAID0 (Redundant Array of Independent Disks 0) and RAID1, Resilient File System (ReFS) and Apple File System (APFS). File system formats differ in the organized structure used to define the location of the files within the storage medium. File system formats can provide different properties with regard to speed, flexibility, security, size and more. Some file system formats have been designed to be used for specific applications.

The selection of one particular file system format over another file system format is a decision that may be made based on the operating system of the intended host computer system(s) of a data storage device, the nature, size or format of the files to be stored on the data storage device or other factors.

SUMMARY

This disclosure relates to a data storage device with an integrated controller that selects a file system format and then formats the storage medium with that selected format. As a result, a user can readily use the formatted data storage device on a host computer system without the process of formatting the storage medium by the operating system of the host computer system.

Disclosed herein is a data storage device comprising a non-transitory storage medium configured to store user content data, a data port configured to transfer the user content data between the storage medium and a host computer system over a data channel, and a controller. The controller is configured to select one of multiple file system formats, format the storage medium by creating a file system in accordance with the selected file system format on the storage medium, and register with the host computer system as a block data storage device.

In some embodiments, the controller is further configured to connect to an authorized device over a control channel that is different from the data channel, receive, from the authorized device over the control channel, a request to format the storage medium, and format the storage medium in response to receiving the request to format the storage medium. In some embodiments, the control channel is wireless. In some embodiments the data channel is wire-based.

In some embodiments, the request to format includes an indication of a file system format, and the controller is further configured to select the one of the multiple file system formats based on the indication. In some embodiments, the controller is further configured to send to the authorized device a list of file system formats for selection by the authorized device. In some embodiments, the controller is further configured to receive metadata associated with the host computer system over the data channel, determine a class of the host computer system based on the metadata, select the one of the multiple file system formats based on the class of the host computer system, and send an indication of the selected file system format to the authorized device as a recommendation.

In some embodiments, the controller is further configured to receive an indication of one or more of a name, a color and an image for the data storage device, store the indication of the one or more of the name, the color and the image for the data storage device, and send the indication of the one or more of the name, the color and the image for the data storage device to the host computer system during registration as the block data storage device.

In some embodiments, the request to format is associated with a request to cryptographically erase the storage medium.

In some embodiments, the controller is further configured to generate one or more keys for encryption and decryption of user content data to be stored on the storage medium.

In some embodiments, the data storage device comprises multiple storage media, and formatting comprises creating metadata to define a redundant array of independent disks (RAID) including the multiple storage media.

In some embodiments, the controller is further configured to create a unique identifier, and send the unique identifier to the host computer system during registration as the block data storage device.

In some embodiments, the controller is further configured to format the storage medium based on stored formatting data. The formatting data may be stored in a partition of the storage medium that is inaccessible by the host computer system. In some embodiments, the stored formatting data comprises a compressed image, and formatting comprises decompressing the compressed image onto the storage medium. In some embodiments, the compressed image comprises a file allocation table, and decompressing the compressed image comprises writing the file allocation table onto the storage medium.

In some embodiments, the controller is further configured to receive metadata associated with the host computer system over the data channel, the metadata indicating a class of the host computer system, select the one of the multiple file system formats based on the class of the host computer system, and format the storage medium with a file system in accordance with the selected file system format.

In some embodiments, the controller is further configured to register with the host computer system as a mass data storage device without a storage medium present before formatting, and register with the host computer system as a mass data storage device with a storage medium present after formatting. In some embodiments, the controller is further configured to determine whether the storage medium is unformatted, responsive to determining that the storage medium is unformatted, format the storage medium, and store an indication that the storage medium is formatted.

Disclosed herein is a method for formatting a data storage device, wherein the data storage device comprises a controller and a non-transitory storage medium. The method comprises selecting, by the controller, one of multiple file system formats, formatting, by the controller, the storage medium by creating a file system in accordance with the selected file system format on the storage medium, and registering the data storage device with a host computer system as a block data storage device.

Disclosed herein is a data storage device comprising a non-transitory storage medium, means for selecting one of multiple file system formats, means for formatting the storage medium by creating a file system in accordance with the selected file system format on the storage medium, and means for registering the data storage device with a host computer system as a block data storage device.

BRIEF DESCRIPTION OF DRAWINGS

A non-limiting example will now be described with reference to the following drawings, in which.

DESCRIPTION OF EMBODIMENTS

Figure 1:
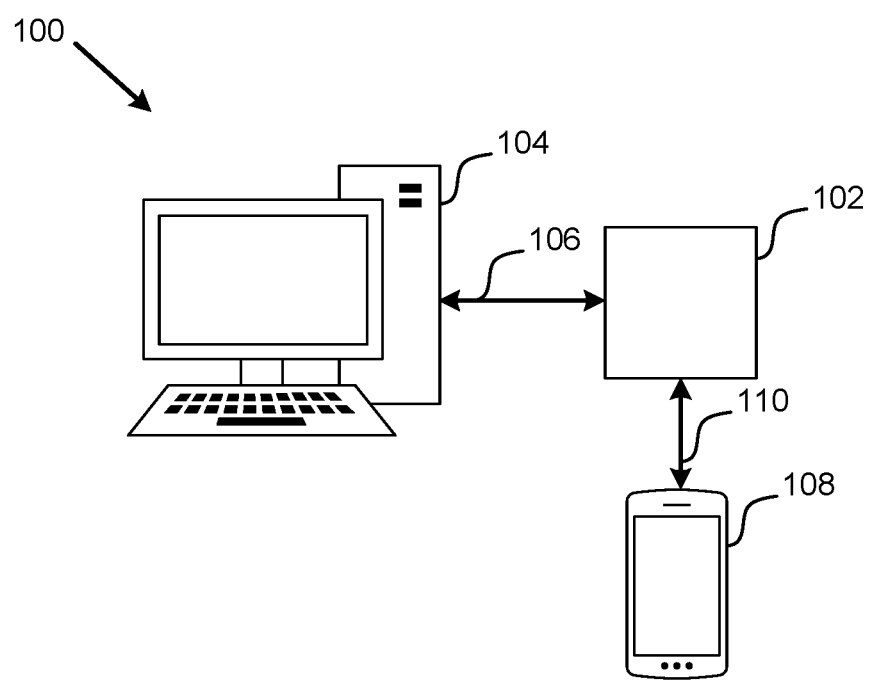
FIG. 1 illustrates a computer network including a data storage device, according to an embodiment.

Data storage devices comprise a storage medium and control circuitry integrated within a device housing. Formatting a storage medium typically refers to the process of preparing the storage medium for the storage of user content data in the form of files. Formatting includes the process of setting up an empty file system on a storage medium, or a partition thereof. Specifically, formatting a storage medium entails creating a file system structure (such as a file allocation table) on the storage medium.

Some operating systems of host computer systems enable the storage medium of a data storage device to appear as multiple logical devices; i.e., partitioned into multiple devices. Accordingly, formatting may include the step of segmenting the storage medium into two or more partitions. Each partition of the storage medium may appear as a separate storage medium to a host operating system, and it may be possible to create a file system on each partition of a partitioned storage medium.

Multiple file system formats exist, and each file system format defines a different structure for organizing and recording file storage. Each of these file system formats has a different structure; however, in general, each file system format includes a directory in which file details are stored, and a space to store the files.

In the situation where an unformatted data storage device is communicatively coupled to a host computer system, for example by connecting via a Universal Serial Bus (USB) data port, it is often the case that the host computer system seeks to determine whether the storage medium of the data storage device is formatted for storing user content data and whether the data storage device is formatted with a file system format that is compatible with the operating system of the host computer system. If the data storage device is not formatted with a file system, the host computer system provides the user with an indication that the data storage device is not formatted, i.e., via a message within a user interface on the host computer system. The host computer system requests the user to indicate whether formatting the data storage device is desired and which file system format is to be applied. Accordingly, the user is required to take action, and provide instructions to the data storage device, via the operating system of the host computer system, in order for the data storage device to become operational for the storage of user content data. Often, the indication from the host computer system is in the form of an error message that can confuse a user or make the user believe that there is an unforeseen error. With existing technology, it is difficult for the manufacturer of the data storage device to improve this user experience because the user interaction is entirely controlled by the operating system, which is out of the control of the manufacture of the data storage device.

In accordance with an embodiment of the invention, there is provided a data storage device which is capable of formatting its storage medium with at least one of multiple different file system formats. Specifically, the data storage device is configured to select one of multiple file system formats, and format a storage medium with a file system format in accordance with the selected file system format.

Advantageously, the provided data storage device does not require user input to the operating system of the host computer system in order to format the storage medium with a file system format that is suitable for use with the host computer system.

Embodiments of the data storage device will now be described with reference to FIGS. 1 to 7

Network Diagram

FIG. 1 illustrates computer network 100 including a data storage device 102, a host computer system 104 and an authorized device 108, according to an embodiment.

Host computer system 104 comprises a processor and a volatile memory (RAM). The host computer system executes an operating system, such as Windows 10 or MAC operating system. The data storage device 102 may be physically located within host computer system 104 or outside host computer system 104, such as on a separate rack in a server room, in a cloud storage architecture or connected as an external drive via USB or Firewire.

The data storage device 102 is communicatively connected to the host computer system 104 via a data channel 106, such as a Universal Serial Bus (USB), a Fibre Channel (FC), a Serial ATA (SATA), a Serial Attached SCSI (SAS), SCSI Parallel Interface (SPI) or others. The data channel may be a wire-based or wireless communication channel.

The authorized device 108 may be used by a user of the data storage device to control the operation of the data storage device 102. The data storage device 102 is communicatively connected to the authorized device 108 via a control channel 110. In the example illustrated in FIG. 1, the authorized device 108 is a smart phone, and the control communication channel is a Bluetooth Low Energy (LE) connection. In other embodiments, the authorized device may be a personal computer or other communication device, and the control communication channel may be a wire-based or wireless communication channel (using any suitable communication protocol, not just Bluetooth LE).

Data Storage Device Architecture

Figure 2:
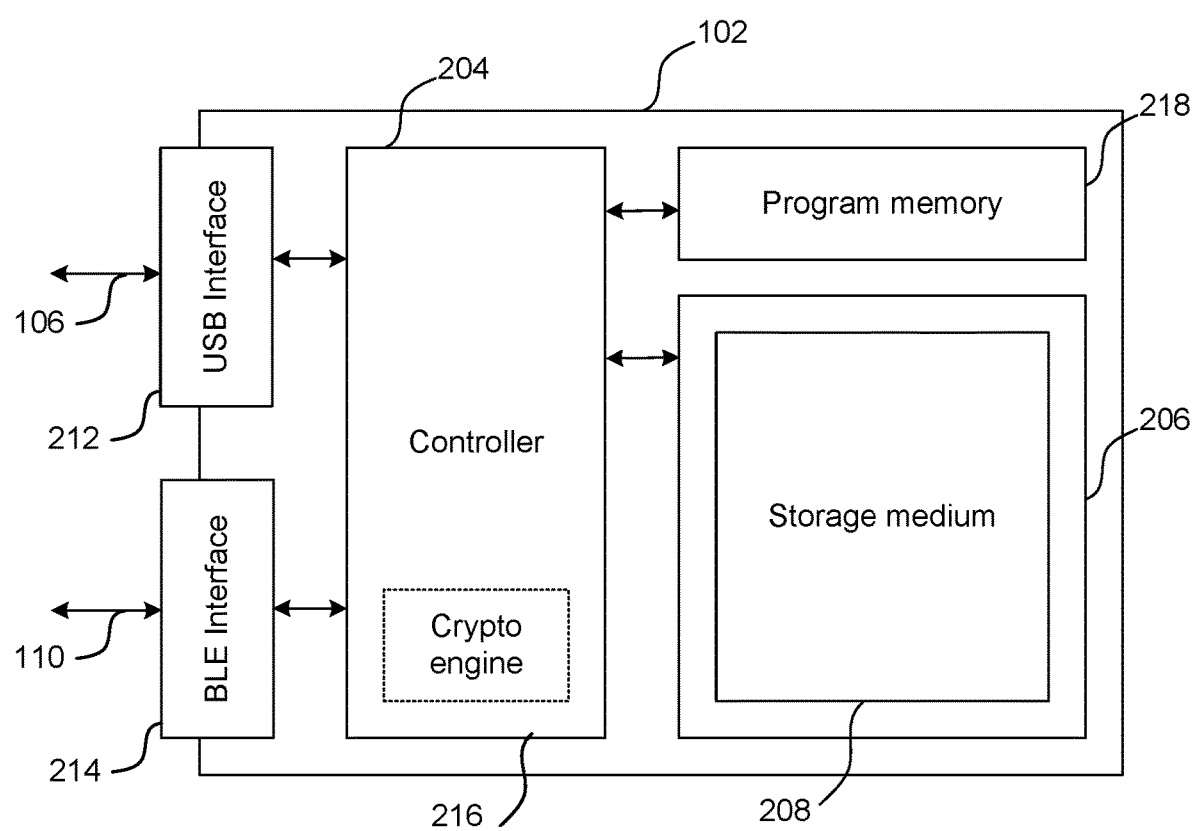
FIG. 2 is a block diagram illustrating components of the data storage device of FIG. 1, according to an embodiment.

FIG. 2 illustrates the components of an example data storage device 102, according to an embodiment. Data storage device 102 comprises a controller 204 which comprises hardware circuitry, such as a microcontroller with a x86, Reduced Instruction Set Computing (RISC), Advanced RISC Machine (ARM), or other architecture. The controller is communicatively coupled to program memory 218.

Data storage device 102 further comprises a non-volatile physical storage medium 208 and a read/write device 206 to store user content data as file system data objects using block addressing. This means the multiple file system data objects are addressable by respective ranges of blocks. This is generally referred to as a block device, which means the data storage device 102 supports reading and writing data in fixed-size blocks, sectors or clusters. For example, these blocks may be 512 bytes or 4096 bytes each. Examples include block devices with rotating media, such as hard drives, and block devices using solid-state media, such as NAND flash memory cards, NAND flash memory chips and solid state drives (SSDs).

The controller 204 is integrated with the data storage device 102, which means that controller 204 is within an enclosure that contains all parts of the data storage device 102 including the physical storage medium 208. The integration of the controller 204 with the data storage device 204 means that signals between controller 204 and storage medium and read/write device 206 are not readily accessible from the outside of the data storage device 102 without disassembly of data storage device 102.

The controller 204 has access to program memory 218 which includes program code which defines the operation of the controller. In the example illustrated in FIG. 2, the program memory 210 is non-volatile memory, such as a Read Only Memory (ROM), separate from the storage medium. Although, in another example, the program may be stored in a section of the storage medium which is not writable, or even readable by a host computer system. In yet another example, the program code defining the operation of the controller 204 may be hardcoded into the controller's logical circuitry, rather than defined by software instructions stored in program memory.

Considering again the embodiment in FIG. 2, the controller 204 is configured to execute the program code retrieved from program memory 218 to select a file system format, and to create a file system of the selected format on the storage medium.

The controller 204 is communicatively coupled to a USB interface 212 which provides a port for data channel 106 via which the data storage device 102 may communicate with a host computer system 104. The host computer system 104 is configured to transmit read and write requests, to send and receive file data to the data storage device 102 via the data channel 106.

The controller 204 is also communicatively coupled to a Bluetooth Low Energy (BLE) interface 214 which provides a port for control channel 110 via which the data storage device communicates with an authorized device 108.

In the example illustrated in FIG. 2, the controller 204 further comprises dedicated cryptographic hardware circuitry 216 to perform cryptographic function, such as an Application Specific Integrated Circuit (ASIC) implementation, or gate level, semi-custom, or full-custom implementation of an encryption and decryption algorithm. This provides the advantage that all reads and writes to and from the data storage device 102 can be encrypted and decrypted at the full speed of the data storage device 102 so that encryption and decryption does not slow down the data transfer between host computer system 104 and data storage device 102. Example encryption and decryption algorithms that can be implemented in hardware include Blowfish and Advanced Encryption Standard (AES) with 128 bit, 192 bit or 256 bit key length.

The controller 204 is configured to generate one or more keys for encryption and decryption of user content data on the storage medium such as by implementing the Trusted Computing Group (TCG) Opal command set. The controller 204 executes the program code on program memory 218 and as a result encrypts user content data to be stored on the storage medium 208 by employing the cryptographic hardware circuitry 216. The controller 204 is also configured to execute program code of program memory 218 to decrypt user content data stored on the storage medium based on one or more cryptographic keys, also by employing the cryptographic hardware circuitry 216. Parts of the cryptographic hardware circuitry 216 may be de-activated to send and receive encrypted data.

Formatting a File System

Figure 3:
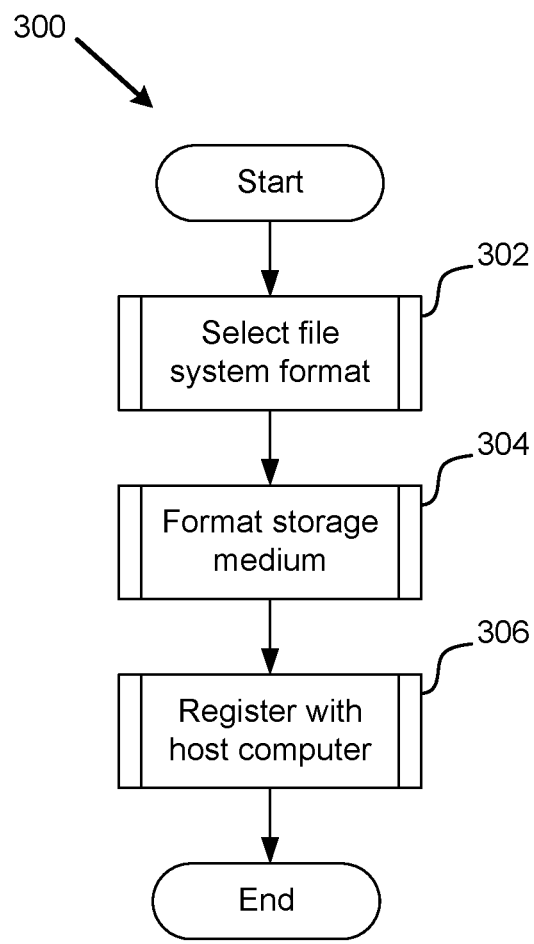
FIG. 3 is a flowchart illustrating a method as performed by a data storage device, according to an embodiment.

FIG. 3 illustrates a method 300, as performed by a controller of a data storage device (such as controller 204 of data storage device 102), according to an embodiment. In accordance with method 300, the controller selects 302 a file system format, formats 304 the storage medium with a file system in accordance with the selected file system format, and registers 306 the data storage device as a block data storage device with the host computer system. Method 300 is defined by source code which is stored on program memory (such as program memory 218), and executed by the controller.

Figure 5A:
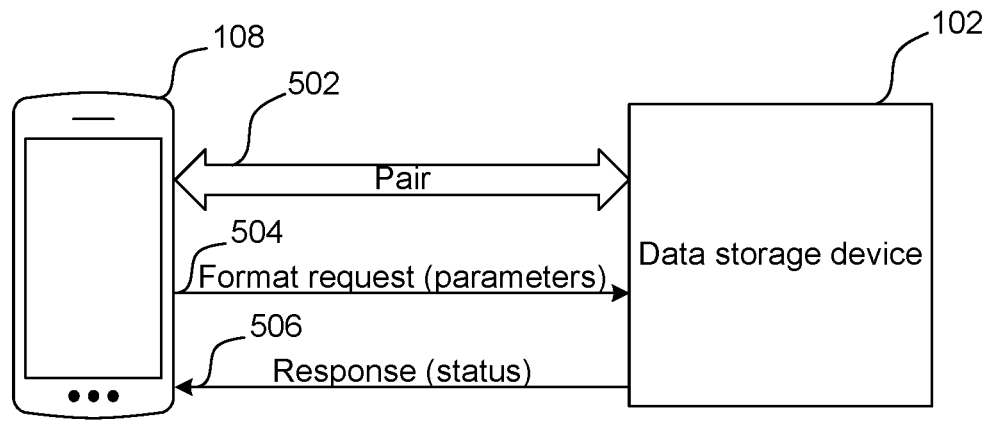
FIG. 5a is a flow diagram of messages communicated between an authorized device and a data storage device, according to an embodiment.
Figure 5B:
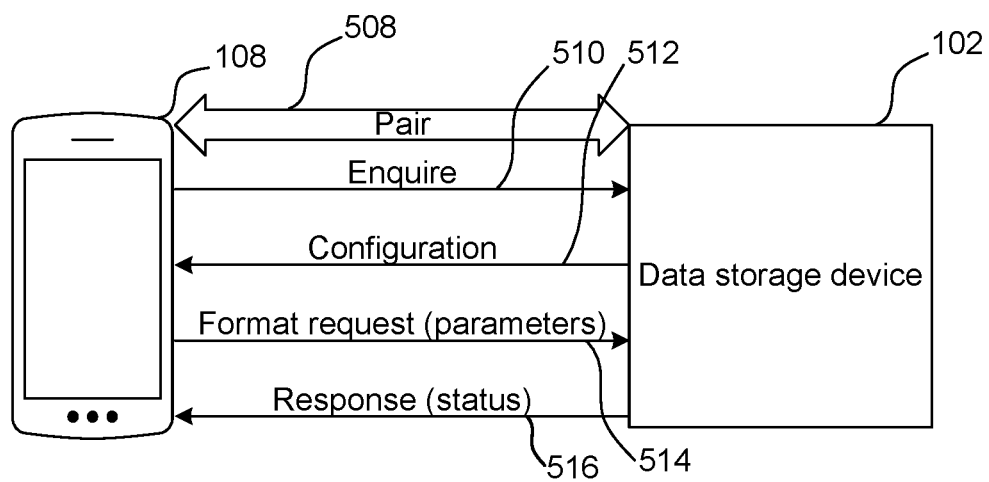
FIG. 5b is a flow diagram of messages communicated between an authorized device and a data storage device, according to an embodiment.

In one example, described further in relation to FIGS. 5a and 5b, the controller 102 is configured to format the storage medium 208 in response to receiving a format request from the authorized device over the control channel 110. In another example, described further in relation to FIGS. 6 and 7, the controller is configured to perform method 300 in response to detecting a connection to a host computer system over the data channel 106.

Irrespective of the trigger for method 300, in step 302, the controller 102 selects one file system format from the plurality of file system formats that the data storage device is configured to support.

In step 304, the controller 204 formats the storage medium 208 with a file system by writing the structural components of a file system, of the selected file system format, to the storage medium, such that the storage medium is ready for subsequent writing of files to the storage medium by the host computer system.

Compressed File System Representation

In one example, the data storage device controller 204 is configured to format the storage medium, in step 304, based on stored formatting data. Specifically, the controller 204 is configured to perform step 304 by decompressing a compressed representation of a file system, and writing the decompressed file system to the storage medium.

Figure 4:
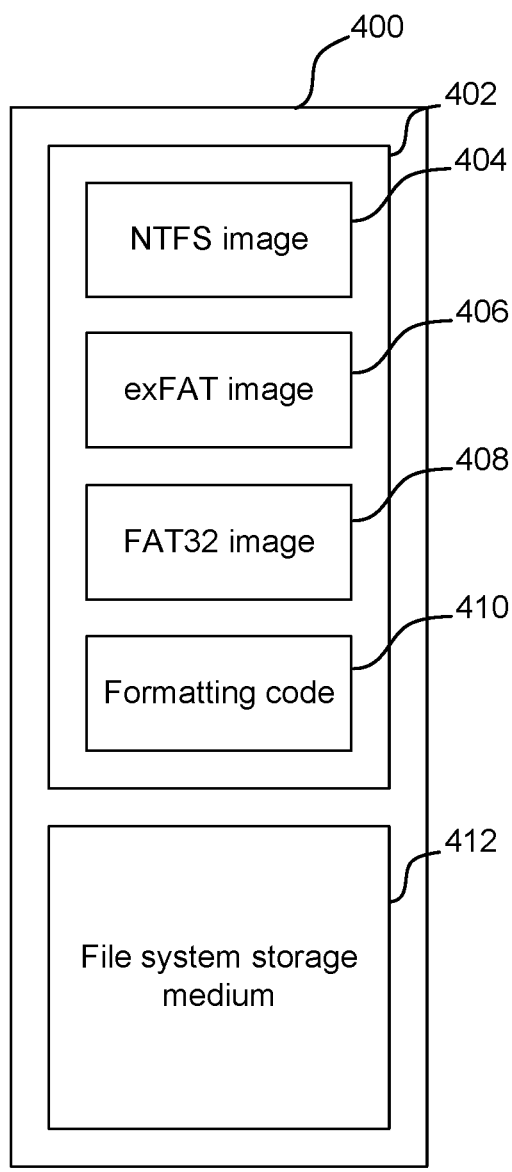
FIG. 4 illustrates the contents of a hidden partition of a storage medium of a data storage device, according to an embodiment.

FIG. 4 illustrates the composition of a storage medium 400 for an example embodiment of a data storage device. The storage medium 400 comprises a hidden partition 402, which is non-volatile memory that is inaccessible by a host computer system or other external device. The storage medium 400 also comprises a section 412 of the storage medium for storing user data in the form of files.

Example hidden partition 402 contains compressed representations, also called compressed images (i.e., compressed binary data objects), for three file systems; NTFS 404, exFAT 406 and FAT32 408. These compressed representations each comprise the structural components of a file system of a particular file system format, with the structural components stored in substantially adjacent locations to reduce the required storage space. The compressed representations also contain instructional information which indicates where each of the structural components should be stored in the storage medium, responsive to the creation of a file system by the controller. This instructional information may be in the form of relative positional information, and the controller may adjust the relative positional information to accommodate the intended size of the file system at creation. The compressing may be achieved by Lempel-Ziv-Welch (LZW) compression.

The file system components may comprises a file allocation table and decompressing the compressed image comprises writing the file allocation table onto the storage medium. For example, in one embodiment, a compressed representation for a file system of the exFAT file system format comprises at least the following components; a Master File Table (MFT), a MFT mirror, NTFS metafiles (system files), boot sector, volume label and the file system version.

In the example of FIG. 4, the controller 102 is configured, via program code 218, to decompress a selected compressed file system representation by reading each of the structural components of a selected file system format from the hidden partition 402 and byte-wise or block-wise writing each of the structural components to a suitable location in the storage medium in accordance with the file system format requirements, to create an empty file system within the storage medium. In this example, the writing is file-system agnostic since the image is in binary form and controller 102 reads, decompresses and writes the image simply byte by byte, block by block, or sector by sector, onto storage medium 400 without having regard to file locations, file sizes, etc.

Formatting Source Code

In the example of FIG. 4, the data storage device 102 also includes formatting source code 410 which defines steps taken by the controller 204 to write the file system structural components to the storage medium to create the empty file system according to a selected file system format. Specifically, the controller 204 is configured to create the structural components of the file system in the storage medium 208 through the execution of formatting source code. The formatting source code 410 provides instructions indicating the write operations to be performed by the controller to create the structural components of a file system in the storage medium. The formatting source code is stored in memory accessible to the controller 204, such as program memory 218 or hidden partition 402.

Compressed Representations and Source Code

It is noted that a data storage device may be configured to store compressed representations of file systems of one or more file system formats in hidden memory. A data storage device may also be configured to comprise formatting program code which includes the instructions required to create file systems of one or more other file system formats. Alternatively, a data storage device may not include compressed representations of file systems, but may only comprise formatting program code which includes the instructions required to create file systems of one or more file system formats.

In one example, the data storage device includes a NTFS file system and an exFAT file system stored as compressed images in a hidden partition, and the data storage device also includes formatting source code configured to write the structural components of a FAT32 file system to the data storage device. Hidden partitions are logical partitions of the storage medium that are not exposed to the host computer system. That is, the host computer system does not have access to those partitions.

Formatting may be Reformatting

In some situations, the storage medium of the data storage device may already be formatted with a file system. This may be a factory formatted file system, or an existing file system from a previous use of the storage medium. A controller may be configured to reformat the storage medium according to a selected file system format, by overwriting parts of the existing contents of the storage medium with the structure of a new blank file system. In another example, the factory default may be a FAT32 file system, which is compatible with most operating systems but a user may wish to reformat this to a more efficient file system for a particular operating system. Alternatively, a controller may be prevented from reformatting the storage medium.

In a further example, the data storage device comprises multiple storage media and in the formatting step 304, the controller formats the multiple storage media with metadata to define a redundant array of independent disks (RAID) including the multiple storage media. In one example, the formatting may comprise reformatting at least part of the storage medium from a RAID0 format to a RAID1 format, or vice versa. In one example where the storage medium is an SSD, formatting may comprise that the controller tunes available space on the storage medium for internal use to increase life as chosen by the user on their authorized device.

Unformatted State Flag—Write-Once

An example method by which the controller may be prevented from reformatting the storage medium is through the use of a once-writable flag which is set at the time of first format of the data storage device. The once-writable flag may be implemented as an eFuse that can be 'burnt' once. The controller can be configured to not perform file system formatting if the once-writable flag is set.

Prior to the data storage device 502 being connected to the host computer system 504, the data storage device 502 is in an unformatted state. The unformatted state may be indicated by an unformatted state flag located in the controller's memory. The unformatted state flag may be a 'read many, write once' flag. The flag may be set at the time of manufacturing the data storage device. The controller may unset the unformatted state flag, once the storage medium has been formatted, by writing a 0 to the unformatted state flag. The unformatted state flag may be configured as a write-once flag, which cannot be altered after being written to the first time (e.g., an eFuse). A write-once flag prevents the unformatted flag from being reset once unset, which in turn prevents the storage medium from being reformatted a second time after being initially formatted.

Registering the Data Storage Device

In step 302, the controller 204 registers, with the host computer system, as a block data storage device according to the Universal Serial Bus (USB) Mass Storage Device Class (USB MSC or UMS), that is, USB device class 08h. Further, controller 204 may disclose its subclass as providing a SCSI transparent command set as a SCSI Peripheral Device Type 00h (Direct-access block device).

Universal Serial Bus (USB) devices provide information in the form of a USB device descriptor. The USB device descriptor contains relevant information about the device. Accordingly, in embodiments in which the data storage device is connected to a host computer system via a USB connection, the data storage device registers with the host computer system as a block data storage device by configuring its USB device descriptor to indicate that the data storage device is a block data storage device. In this sense, 'register' with the host computer system means that controller 204 provides the information to the host computer system that enables the host computer system to integrate the data storage device into the list of available mass data storage devices by the operating system of the host computer system.

The USB device descriptor provides structured information regarding the USB device such as the class of device, protocols supported, type of device, manufacturer and other configuration parameters. An operating system of a host computer system can obtain the USB device descriptor of the data storage device by sending various standard control requests (i.e., GET_DESCRIPTOR requests) to the data storage device. In response to receiving these requests, the data storage device provides the USB_DEVICE_DESCRIPTOR to the host computer system, thus registering the data storage device with the host computer system as a block data storage device. The host computer system interprets the USB_DEVICE_DESCRIPTOR to determine the configuration and capabilities of the data storage device. The host computer system may then store information regarding the data storage device in the registers of the operating system of the host computer system.

Unique Identifier

In one example, the controller creates a unique identifier, such as a Universally Unique Identifier (UUID) or Globally Unique Identifier (GUID). The controller sends the unique identifier to the host computer system during registration as a block data storage device. In turn, the host computer system can use the unique identifier to distinguish each individual data storage device from other data storage devices. This is particularly advantageous in cases where multiple data storage devices are used that all employ the methods described herein because without the generation of the unique identifier, the host computer system may confuse different data storage devices.

In yet a further example, the controller registers with the host computer system as mass data storage device without medium present before formatting and switches to medium present after formatting.

Formatting Triggered by Authorized Device

As noted above, the data storage device may be configured to format the storage medium in response to receiving a format request from the authorized device over the control channel 110. The control channel is a communication channel via which the data storage device can communicate with an authorized device operated by a user. The authorized device enables the user to control the operation of the data storage device, via a communication channel which is out-of-band with respect to the data channel between the data storage device and the host computer system.

FIGS. 5a and 5b illustrate the flow of messages between the authorized device 108 and the data storage device 102 over a control channel implemented via the Bluetooth LE protocol. Specifically, FIG. 5a is a message flow diagram, showing the transmission of messages between the authorized device 108 and the controller 204 of the data storage device 102, according to an embodiment. The authorized device 108 and the data storage device 102 establish a Bluetooth LE connection by pairing 502 in accordance with that protocol.

After the control channel has been established by the Bluetooth LE pairing, the authorized device 108 transmits a format request message 504 to the data storage device 102 indicating the parameters for the file system formatting. The parameters comprise at least an indication of the requested file system format and may also comprise other configuration parameters such as partition size and identifying name.

In one example, the parameters comprise an indication of one or more of a name, color and image for the data storage device. The controller is configured to store the indication of one or more of a name, color and image in a memory component of the data storage device and send the indication of one or more of a name, color and image for the data storage device to the host computer system during registration as a block data storage device, as performed in step 306. This way, the operating system of the host computer system can display the data storage device in a list of available data storage devices, with a specific name, color and/or image that enables the user to readily identify the desired data storage device.

In the example illustrated in FIG. 5a, the format request 504 transmitted by the authorized device 108 to the data storage device 102 includes a request that the data storage device cryptographically erase the storage medium before formatting the storage medium. The process of crypto-erasing comprises erasing cryptographic keys stored on the storage medium, such that encrypted data stored on the storage medium can no longer be decrypted. For example, the data storage device 102 may cryptographically erase the cryptographic keys by overwriting the cryptographic keys on the storage medium with zeros, ones or random data. The advantage of crypto-erasing is that typically, re-formatting only re-creates the file system structure but leaves the actual file data unaffected. As a result, file data can still be retrieved by lower-level operations (i.e., direct READ SECTOR commands) or even by physical access such as by measuring residual magnetization. However, once the storage medium is cryptographically erased, the data retrieved from these operations is encrypted without access to the actual file data.

After crypto-erasing the storage medium, the controller 204 of the data storage device performs the formatting process, as described in relation to method 300 above. Specifically, the controller 204 of the data storage device 102 selects a file system format in accordance with the parameters of the format request message 504, formats of the storage medium through the creation of a file system in accordance with the parameters of the format request message 504, and registers with the host computer system as a block data storage device.

After completing the formatting process, the controller of the data storage device transmits a status response message 506 to the authorized device 108. The status response message indicates the successful completion of the formatting process, or indicates error information if successful completion of the formatting process was not possible.

For example, if the authorized device 108 requests the data storage device 102 to create a file system format which the data storage device has not be configured to create, the data storage device returns an error message to the authorized device. Additionally, if the data storage device encounters an error during formatting the storage medium, the data storage device returns an error message to the authorized device.

FIG. 5b illustrates an alternative example, in which the authorized device 108 first enquires as to the configuration of the data storage device 102 before requesting file system formatting, according to an embodiment. Specifically, following the Bluetooth LE pairing process 508, the authorized device transmits a configuration enquiry message 510. In response, the controller of the data storage device transmits a configuration response message 512 which includes a list of the file system formats that the controller can format the storage medium with. The configuration response message 512 may also indicate the size of the storage medium, the number of existing partitions, available space and other information which may be influence the authorized device's use of the data storage device.

Based on the configuration response message 512, the authorized device transmits, to the data storage device, a format request 514 which includes request parameters indicating the requested file system format and may also indicate other configuration parameters such as partition size, and an identifying name for the data storage device.

If the storage medium has been partitioned into a plurality of partitions, the request message 514 may also include an indication of the partition within the storage medium where the controller is requested to create a file system. Alternatively, the data storage device may select a suitable partition in which to create a file system as requested by the authorized device.

The controller of the data storage device performs the formatting of the storage medium through the creation of a file system in accordance with the parameters of the format request received from the authorized device. The formatting process is performed in accordance with the method 300.

After completing the formatting process, the controller of the data storage device transmits a response message 516 to the authorized device indicating the successful completion of the formatting process, or error information if successful completion of the formatting process was not possible.

Formatting Triggered by First Connection to Host

Alternatively, or in addition to a data storage device being configured to format the storage medium in response to receiving a format request from the authorized device over the control channel, a data storage device may be configured to perform method 300 in response to detecting a connection to a host computer system via a data channel.

Figure 6:
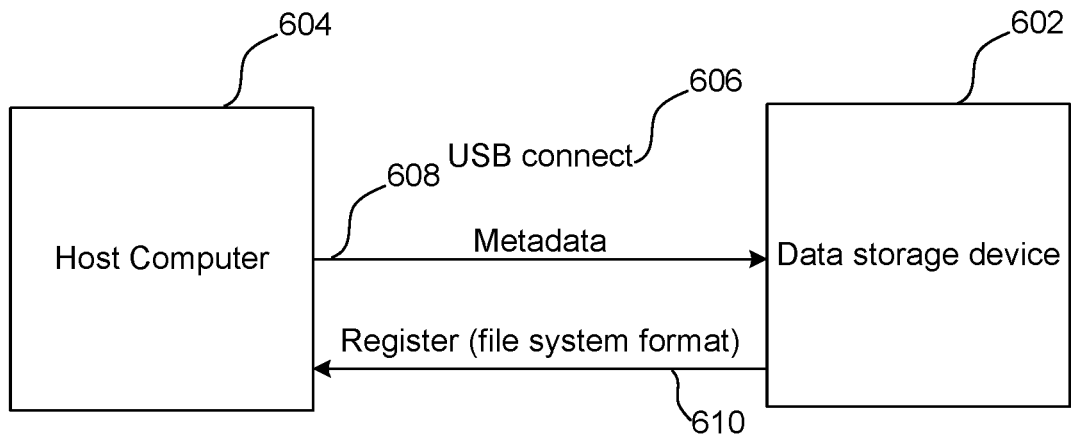
FIG. 6 is a flow diagram of messages communicated between a host computer system and a data storage device, according to an embodiment.

FIG. 6 illustrates a data storage device 602 which has the structure of data storage device 102, according to an embodiment. However, the controller of the data storage device 602 is configured to format the storage medium by creating a file system in response to a USB connection to a host computer system 604.

In example of FIG. 6, the USB data port of data storage device 602 is connected to a USB data port of the host computer system 604, in event 606. This USB connection forms a data channel between the data storage device 602 and the host computer system 604. The data storage device 602 may also be electrically powered by the host computer system 604 via this USB connection.

Upon connection of the data storage device 602 to the host computer system 604 via the data channel, the data storage device determines whether the storage medium is in a formatted or an unformatted state. The formatted/unformatted state of the storage medium is indicated by an unformatted state flag located in the data storage device 602. The unformatted state flag may be a 'read many, write once' flag. The flag may be set at the time of manufacturing the data storage device. The unformatted state flag may be set to 1 to indicate that the storage medium is unformatted.

If the unformatted state flag is set, the data storage device determines that the storage medium is unformatted, and the data storage device 602 is configured to receive metadata associated with the host computer system over the data channel formed by the USB connection, and to determine a class of host computer system based on the metadata.

The data storage device 602 proceeds to format the storage medium through the execution of method 300. Specifically, based on the class of host computer system, the controller of data storage device 602 is configured to select one of multiple file system formats, and to format the storage medium of data storage device 602 by creating a file system in accordance with the selected file system format.

The controller unsets the unformatted state flag, once the storage medium has been formatted, by writing a 0 to the unformatted state flag. The unformatted state flag set as 0 provides an indication that the storage medium is formatted. The controller of the data storage device 602 registers 610 with the host computer system 604 as a block data storage device.

Figure 7:
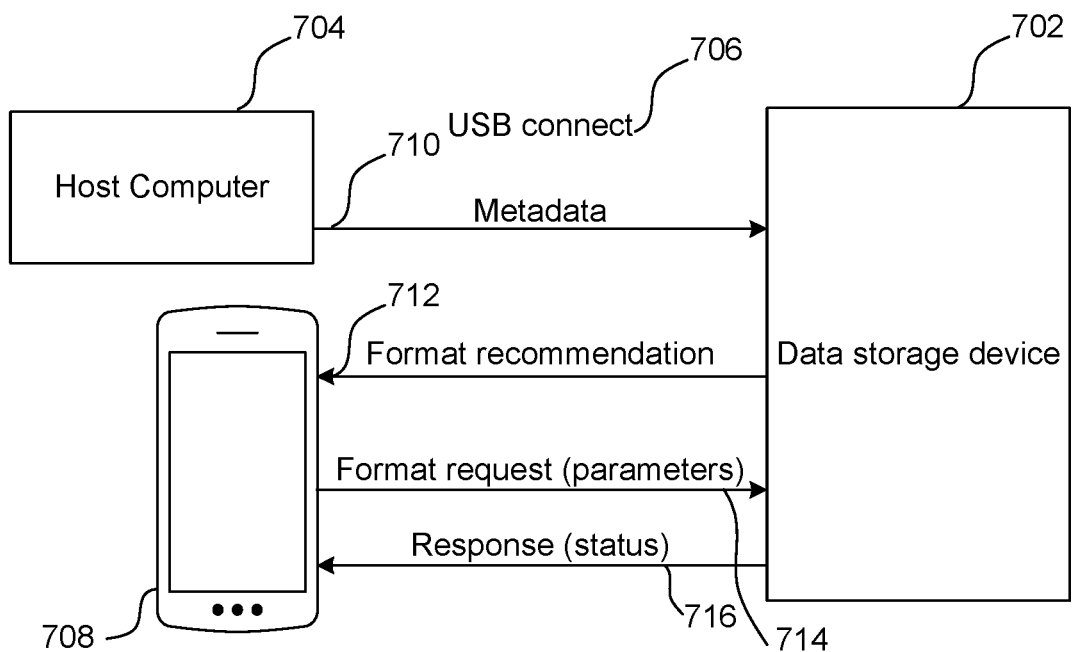
FIG. 7 is a flow diagram of messages communicated between a host computer system, a data storage device and an authorized device, according to an embodiment.

FIG. 7 illustrates an embodiment in which the controller of data storage device 702 is configured to send an indication of a selected one of the multiple file systems to an authorized device 708 as a file system format recommendation to a user of the authorized device.

In response to receiving metadata 710 associated with the host computer system 704 over the data channel formed by a USB connection 706 of the data storage device 702 to the host computer system 704, the controller of the data storage device 702 determines a class of host computer system based on the metadata (such as Windows or iOS), and selects one of multiple file system formats based on the determined class of host computer system.

The data storage device 702 sends a format recommendation message 712 to the authorized device 708 over a control channel. The format recommendation message 712 includes an indication of the selected one of multiple file system formats based on the determined class of host computer system.

Optionally, and dependent upon the user's configuration of the authorized device, the authorization device 708 may transmit a format request message 714 to the data storage device 702 over the control channel, requesting that the data storage device 702 format the storage medium with the selected file system format. The data storage device 702 may then proceed to format the storage medium, in accordance with method 300, and provide a response message 716 to the authorized device, as previously described in relation to FIG. 5b.

In another embodiment, the controller of a data storage device is configured to determine whether the storage medium is unformatted, based upon the unformatted state flag, and upon determining that the storage medium is unformatted, automatically format the storage medium and store an indication that the storage medium is formatted.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a non-transitory storage medium configured to store user content data;
a data port configured to transfer the user content data between the storage medium and a host computer system over a data channel; and
a controller configured to:
connect to an authorized device over a control channel that is different from the data channel, wherein the authorized device is different than the host computer system;
receive, from the authorized device over the control channel, a request to format the storage medium;
receive metadata associated with the host computer system over the data channel;
determine, based on the metadata, a class of the host computer system;
select, based on the class of the host computer system, one file system format of multiple file system formats;
format, responsive to receiving the request to format the storage medium, the storage medium by creating a file system in accordance with the selected file system format on the storage medium; and
register with the host computer system as a block data storage device.

2. The data storage device of claim 1, wherein:
the request to format includes an indication of a file system format; and
the controller is further configured to select the one file system format of the multiple file system formats based on the indication.

3. The data storage device of claim 2, wherein the controller is further configured to send to the authorized device a list of file system formats for selection by the authorized device.

4. The data storage device of claim 1, wherein the controller is further configured to
send an indication of the selected file system format to the authorized device as a recommendation.

5. The data storage device of claim 1, wherein the controller is further configured to:
receive an indication of one or more of a name, a color and an image for the data storage device;
store the indication of the one or more of the name, the color and the image for the data storage device; and
send the indication of the one or more of the name, the color and the image for the data storage device to the host computer system during registration as the block data storage device.

6. The data storage device of claim 1, wherein the request to format is associated with a request to cryptographically erase the storage medium.

7. The data storage device of claim 1, wherein:
the control channel is wireless; and
the data channel is wire-based.

8. The data storage device of claim 1, wherein the controller is further configured to format the storage medium based on stored formatting data.

9. The data storage device of claim 8, wherein the formatting data is stored in a partition of the storage medium that is inaccessible by the host computer system.

10. The data storage device of claim 8, wherein:
the stored formatting data comprises a compressed image; and
formatting comprises decompressing the compressed image onto the storage medium.

11. The data storage device of claim 10, wherein:
the compressed image comprises a file allocation table; and
decompressing the compressed image comprises writing the file allocation table onto the storage medium.

12. The data storage device of claim 1, wherein the controller is further configured to generate one or more keys for encryption and decryption of user content data to be stored on the storage medium.

13. The data storage device of claim 1, wherein:
the data storage device comprises multiple storage media; and
formatting comprises creating metadata to define a redundant array of independent disks (RAID) including the multiple storage media.

14. The data storage device of claim 1, wherein the controller is further configured to:
create a unique identifier; and
send the unique identifier to the host computer system during registration as the block data storage device.

15. The data storage device of claim 1, wherein the controller is further configured to:
register with the host computer system as a mass data storage device without a storage medium present before formatting; and
register with the host computer system as a mass data storage device with a storage medium present after formatting.

16. The data storage device of claim 1, wherein the controller is further configured to:
determine whether the storage medium is unformatted;
responsive to determining that the storage medium is unformatted, format the storage medium; and
store an indication that the storage medium is formatted.

17. A method for formatting a data storage device, wherein the data storage device comprises a controller and a non-transitory storage medium, the method comprising:
connecting the data storage device to a host computer system using a data port, wherein the data port is configured to transfer user content data between the non-transitory storage medium and the host computer system over a data channel;
connecting, by the controller and over a control channel, to an authorized device, wherein:
the control channel is different than the data channel; and
the authorized device is different than the host computer system;
receiving, by the controller and from the authorized device over the control channel, a request to format the non-transitory storage medium;
receiving metadata associated with the host computer system over the data channel;
determining, based on the metadata, a class of the host computer system;

selecting, by the controller and based on the class of the host computer system one file system format of multiple file system formats;
formatting, by the controller and responsive to receiving the request to format the non-transitory storage medium, the non-transitory storage medium by creating a file system in accordance with the selected file system format on the non-transitory storage medium; and
registering the data storage device with the host computer system as a block data storage device.

18. A data storage device comprising:
a controller;
a non-transitory storage medium;
a data port configured to transfer user content data between the non-transitory storage medium and a host computer system over a data channel;
means for connecting, by the controller and over a control channel, to an authorized device, wherein:
the control channel is different than the data channel; and
the authorized device is different than the host computer system;
means for receiving, by the controller and from the authorized device over the control channel, a request to format the non-transitory storage medium;
means for receiving metadata associated with the host computer system over the data channel;
means for determining, based on the metadata, a class of the host computer system;
means for selecting, based on the class of the host computer system, one file system format of multiple file system formats;
means for formatting, responsive to receiving the request to format the non-transitory storage medium, the non-transitory storage medium by creating a file system in accordance with the selected file system format on the non-transitory storage medium; and
means for registering the data storage device with the host computer system as a block data storage device.

* * * * *